United States Patent [19]

Martinez

[11] Patent Number: 4,529,650

[45] Date of Patent: Jul. 16, 1985

[54] IMAGE TRANSFER MATERIAL

[75] Inventor: Ferdinand Martinez, Belmont, Mass.

[73] Assignee: Coulter Systems Corporation, Bedford, Mass.

[21] Appl. No.: 317,445

[22] Filed: Nov. 2, 1981

[51] Int. Cl.[3] ........................ B32B 27/08; B32B 27/36

[52] U.S. Cl. .................................... 428/336; 428/349; 428/380; 428/913; 428/914; 430/11; 430/13; 430/126

[58] Field of Search ............... 428/913, 480, 336, 212, 428/349, 914; 430/11, 126, 13

[56] References Cited

U.S. PATENT DOCUMENTS

| | | | |
|---|---|---|---|
| 4,025,339 | 5/1977 | Kuehnle | 428/697 X |
| 4,337,303 | 6/1982 | Sahyun et al. | 430/11 |
| 4,341,833 | 7/1982 | Schafer et al. | 428/480 X |
| 4,370,379 | 1/1983 | Kato et al. | 428/480 |
| 4,373,002 | 2/1983 | Petersen-Hoj | 428/480 X |
| 4,375,494 | 3/1983 | Stokes | 428/480 X |

*Primary Examiner*—Thomas J. Herbert
*Attorney, Agent, or Firm*—Silverman, Cass & Singer, Ltd.

[57] ABSTRACT

An electrostatic transfer medium comprising a sheet formed of a transparent polyester plastic substrate having a thin transparent coating of a compatible polyester resinous composition having a softening range less than the softening range of the substrate material. A high resolution transparency is formed by electrophotographically forming a toned latent electrostatic image of a document upon an electrophotographic member, bringing the transfer medium into engagement with the image under localized pressure and heat to form a laminate and separating the cooled laminate whereby the image is transferred fully to the coating, the transfer being effected with minimal loss of optical density or resolution and practically no residue remaining on the electrophotographic member. The laminate may be cooled prior to separation.

4 Claims, 3 Drawing Figures

IMAGE TRANSFER MATERIAL

BACKGROUND OF THE INVENTION

This invention relates generally to the transfer of toned electrostatic latent images from the electrophotographic member on which it is formed to a secondary carrier. This invention particularly is concerned with the provision of the secondary carrier formed as a transparent sheet of stabilized polyester sheet material having a heat softenable compatible resinous coating applied to a surface thereof, the secondary carrier capable of receiving substantially complete transfer of a toned image from the electrophotographic member without loss of optical density or resolution, the toned image being embedded in the coating.

Various processes have been proposed for producing an image upon a substrate, including photographic processes involving actinic exposure of a photosensitive material carried on a substrate or electrostatic process involving exposing a charged electrophotographic member having a photoconductive surface coating or layer to radiation to produce an electrostatic latent image. This latent image is rendered visible by application of dry toner particles thereto as in cascade type development, or by wet application thereto of a liquid toner suspension wherein the toner particles have electrophoretic properties.

The production of suitable transparencies heretofore commonly requires the skill of a trained technician and the substantial expenditure of money and time. Photographic reproduction processes require controlled exposure, development, washing and fixing of a light sensitive composition present on a support with or without the intermediate production of a negative image.

Xerographic processes have proven to be an easy and reliable technique for the production of reproductions. Notwithstanding the desirability of these imaging processes, drawbacks have been encountered in forming transparencies in that the adherence of the image on the transfer support leaves much to be desired. Additionally, some loss of optical density and resolution is experienced upon transfer of the toned image to a receiving member employing prior methods.

Electrophotographic processes require the provisision of a suitable image carrier upon which images are formed, these carriers being required to accept an electrical charge and retain the charge sufficiently to enable image to be formed by application of toner particles thereto. Many materials displaying photoconductivity will not accept a charge initially, and of those which may be charged, few are capable of retaining the charge thereon without leaking off or decaying so rapidly as to be almost useless. In addition to accepting a charge and retaining the charge in darkness, the photoconductive layer is required to discharge in light areas to a degree which is fairly rapid and generally proportional to the amount of light to which the surface is exposed impinging upon the charged surface. Further, there must be retained a discernible difference between the remaining charged and uncharged layers without lateral movement of the charges.

With the advent of the electrophotographic member disclosed and claimed in U.S. Pat. No. 4,025,339, same being incorporated herein by reference herein to provide details of the said electrophotographic member, and particularly the electrical anistropy of the patented coating effectively resulting from the field domain of each crystal of the coating which functions independently in the charge and discharge mode without communicating laterally with contiguous crystals. The toner particles thus are attracted by myriads of individual fields in a magnitude dependent upon the magnitude of the individual field strengths of these individual fields enabling the obtaining of resolution heretofore unobtainable by electrophotographic reproduction.

Imaging, toning and transfer of the toned image to a carrier medium using the electrophotographic member of U.S. Pat. No. 25,339 documented in several of the additional patents listed earlier, each of which are incorporated herein by reference to show the method of employing said recording member for forming reproductions of original images.

SUMMARY OF THE INVENTION

A transfer medium is provided for receiving toned electrostatically formed latent images comprising a substrate formed of sheet polymeric material, a thin overcoated layer bonded to said substrate formed of a compatible resinous composition having a softening range less than the softening range of the substrate material. Transfer is effected preferably under localized heat and pressure sufficient to embed the toned transferred image in the overcoated layer.

DESCRIPTION OF PREFERRED EMBODIMENTS

Figure 1:
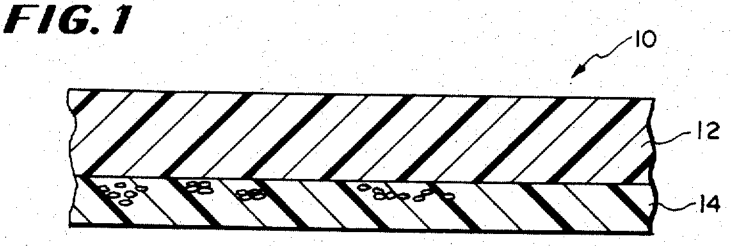
FIG. 1 is a diagrammatic representation illustrating one method of forming a transparency employing the transfer medium according to the invention.
Figure 2:
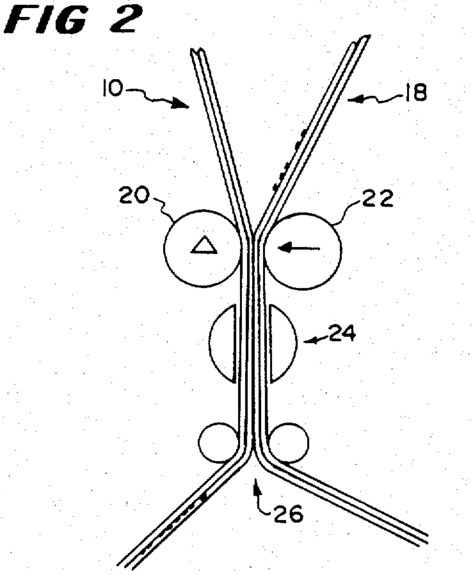
FIG. 2 is a cross-sectional view of the transfer medium according to the invention, same shown in the condition assumed subsequent to transfer and constituting a permanent transparency.

The transfer medium according to the invention is adaptable particularly to receive toned latent images formed upon an electrophotographic member of the type disclosed in U.S. Pat. No. 4,025,339, which member is formed of a flexible substrate, preferably polyester, such as polyethylene glycol terphthalate, carrying a sandwich bonded thereto consisting of a thin film layer of ohmic material such as indium tin oxide and an r.f. sputter-deposited thin coating of a photoconductive material selected from the group cadmium sulfide, etc.

The photoconductive coating carried by the patented electrophotographic member consists of uniformly vertically oriented microcrystals to form a dense, abrasion resistant layer bonded to the ohmic layer earlier deposited on the substrate. The photoconductive layer posseses unique optical and electrical properties notably optical and electrical anisotropy, which enables the coating to be charged rapidly and to hold the charge sufficiently to enable toning subsequent to exposure to an image pattern of the subject matter to be reproduced. An electrostatic latent image of the subject matter to be reproduced is formed on the surface of the electrophotographic member and is made visible by toning. The characteristics of the coating enable unusually high resolution to be achieved and hence, encourage employment most advantageously, in the microcopier-microfiche field. Transfer from the unique image carrier to a film material is required for storage and/or display purposes such as a transparency. It would be highly advantageous that the expensive original electrophotographic member itself solely be used for imaging rather than also functioning as the record storage or a transparency per se. For that purpose it is necessary to provide a transfer medium for receiving the toned image and which can constitute a permanent record.

Another reason for desiring that the record be made permanent upon a transfer medium rather than fusing the toned image to the electrophotographic member itself is that the member has a characteristic color which though transparent, detracts from the end-product. To take advantage of the unusual and superior resolution properties, one must provide a transfer material capable of receiving the toned image without loss of resolution and without loss of optical density. Further, if the transfer is to be effected with full benefit of the imaging process, one would have to provide a transfer medium which will accept all the toned image without leaving any toner residue. One also desires to avoid formation of pin holes or voids in the image.

Polyester substrate materials are preferred although other substrate materials are suitable, such as cellulose acetate, cellulose triacetate and cellulose acetate butyrate.

The preferred resins employed for the overcoating are thermoplastic polyester compositions, the chemical structures of which are similar to that of the preferred substrate manufactured and sold under the trademark MYLAR by the DuPont Company.

The resins in organic solvent solutions are applied to the polyester substrate using conventional coating methods, such as reverse roll type or Meyer rod methods (employing a wire wound rod).

Suitable resins have softening point ranges from a low of 90° a high of 155° C. Suitable resins cannot have a tendency to adhere subsequently to other coated sheets, that is, form a block say after coating is completed.

The solvents employed preferably have low toxicity characteristics. A combination of cellosolve acetate and cyclohexanone or methyl ethyl ketone and toluene can be employed as solvents. For the resin which has a softening point of about 127° C., a solution having a solids content of 7 to 10 percent by weight has been successfully employed. Where the softening ranges of the resin are in the 150° C. range, a solution having 10 to 15 percent by weight solids content in a solvent mixture of methylethyl ketone and toluene can be employed with satisfactory result. A solids content greater than 25% result in striated patterns formed in the coating and is unsatisfactory.

The coatings of the lower softening range have a thickness between 2 to 8 microns, with 6–10 microns giving the test result. The thickness of resin coatings in the upper end of the applicable softening range, is about the same. The higher softening range resins are used generally with solvent mixtures such as Methyl Ethyl Ketone 20 parts and Toluene 80 parts.

Nonfusible toners are preferred but color toners and self-fusible toners can be utilized.

It is important to recognize that the resin is selected so as to enable the toner particles to be embedded within the resin coating. Image transfer to the transfer medium of the invention may be effected by heating the receiving sheet and bringing the heated sheet superimposed over the toned image while simultaneously applying pressure to both sheets, the base and the superimposed transfer medium. The temperature to which the heated roller is raised for transfer to the transfer medium of the invention is about 140°. The temperature at which transfer occurs is between 127° C. and 155° C. at the coating. Transfer attempts at lower temperatures may result in incomplete transfer and/or a remainent ghost image on the master sheet from which transfer is made. The preferred temperature is 140° C.

After heat and pressure have been applied, the two sheets are separated, by peeling or pulling same apart. It has been found that no elevated toner image is formed but that the toner image has become embedded within the coating with no relief pattern being observed. The result is a high gloss, high resolution transparency.

EXAMPLE I

An electrophotographic master comprising a polyester plastic substrate to which has been applied a thin layer of ohmic layer and an r.f. sputtered overlay coating of photoconductive material in accordance with the teachings of U.S. Pat. No. 4,0 25,339 is charged with a negative corona, exposed to an original document and then toned with a nonfusible toner.

A sheet of 5 mil polyethylene glycol terephthalate plastic sheeting (conventionally heat stabilized Mylar Type M654) is coated with a 6–8 micron thick (in dry state) coating of a thermoplastic polyester resin (No. 46950 or No. 49000, sold by DuPont Company, Wilmington, Del.) similar to Mylar from a 1,1,2 trichloroethane solution or a solvent mixture such as cellosolve acetate (1 part) and cyclohexanone (1 part) respectively, thereof having concentration of 10 percent solids and the solvent evaporated, to form the transfer member of the invention.

Similarly, coating solutions comprised of individual thermoplastic polyester resins (Vitel PE-200, PE-207, PE-222, VPE-4583A and VPE-5545A sold by The Goodyear Tire and Rubber Company, Akron, Ohio), or combinations thereof, having a concentration of 15 per cent solids, are satisfactory alternatives for preparation of the transfer member of the invention.

The toned master is brought together with the coating side of the transfer sheet member at a nip between a heated roller and a relatively soft roller, the nip defining a narrow transverse band. In lieu of or in addition to a heated roller, one may apply a stream of hot air at the nip to heat the local area. Pressure is exerted simultaneously with the heating of the coating at the nip to no more than 170° C. (preferably 140°–150° C.). The critical lower temperature is just above the flow point of the resin coating. The critical higher temperature is below the softening range of the substrate. The soft pressure roller can be formed of a hard rubber having about an 80 durometer hardness, The two sheets are laminated at the nip, and immediately thereafter, the laminate is cooled at least to ambient temperature (perhaps lower). The laminate was then separated by peeling, i.e. pulling one sheet from the other. The result is a transparency formed of the resin coated transparent substrate carrying the toner particles of the image actually embedded in the resin coating to define a flat image. The high gloss member has better than 80 percent light transmission.

The transfer temperature was 135°–140° C. with a transfer speed of approximately 3 inches per second. A pressure of 60 pounds per square inch was applied.

The transfer medium 10 is brought into engagement with the master electrophotographic member 18 carrying a dry toned image. The engagement is effected under heat and pressure, the heat emanating from heater roller 20 and the pressure exercised by soft rubber roller 22. The resin coating is thus softened so that the toner particles are embedded in the softened resin overcoat.

In the Figures, the transparency formed in accordance with the invention is designated generally by reference character 10 and comprises a transparent substrate 12 of Mylar polymer sheet having an overcoating 14 formed by a resin compatible with Mylar substrate 12 capable of being softened at a temperature at which the Mylar substrate is unaffected. Using heat and pressure as heretofore described, the toner particles 16 representing the transferred image are embedded permanently in the resin overcoat 14.

The laminate thus formed is rapidly cooled at cooling station 24 as soon as it is formed, the toner having greater adherence to the cooled resin than to the master electrophotographic member and hence remains embedded in the cooled resin. The laminate is separated immediately after cooling, at separating station 26.

Although the cooling station 24 is provided, it is not mandatory positively to cool the laminate before separation.

Figure 3:
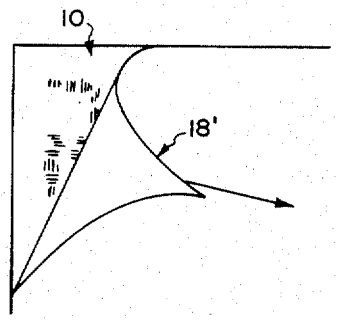
FIG. 3 is a diagrammatic representation of the formation of a transparency employing manual separation of the transfer medium from the toned photoconductive member shown in the process of separating the sheet to Which the transfer is effected from the electrophotographic member.

In FIG. 3, an electrophotographic sheet 18' is illustrated in the process of peeling off from a sheet of transfer material 10 after cooling, forming the transparency.

An important benefit arising from the invention herein is that when a negative type toned image is presented to the photoconductor, a negative image appears on the transfer medium and when a positive image is presented, the end transfer result is a positive image on said transfer medium.

Variations afe capable of being made without departing from the spirit or scope of the invention as defined in the attached claims.

What is desired to secure by Letters Patent of the United States is:

1. A toner image receptor medium being structured to receiver entirely embedded therein without formation of a relief pattern a dry electrostatically formed toner image from the surface of a carrier having said toner image formed thereon, said receptor medium comprising, a transparent substrate and a substantially thinner transparent coating permanently bonded to one outer surface of said substrate, said transparent coating formed of a resinous, nonadhesive polymer material compatible structurally with said substrate and having a softening range lower than the softening range of said substrate, the polymer coating being non-blocking under normal ambient conditions, said coating being preferentially softenable relative to the substrate and being structured to be engagable while softened with the toner image carrying surface of the carrier under simultaneously applied localized heat and pressure to form a peelable relationship with said surface for embedment of a toner image below the surface thereof during formation of said peelable relationship, said coated substrate being structured to be peelable as a unit from the toner image carrier subsequent to formation of said peelable relationship, with the coating carrying the embedded toner image completely therewith and below the coating surface without formation of a relief pattern and with substantially full retention of the optical clarity and resolution of said toner image in the absence of post-transfer further treatment of the receptor medium.

2. The transfer medium as claimed in claim 1 in which the thin coating is less than 15 microns in thickness.

3. The transfer medium as claimed in claim 1 in which said substrate is a polyester plastic sheet material and said thin coating is a thermoplastic polyester resin having a softening range of from 127° to 155° C.

4. The transfer medium as claimed in claim 1 in which said coating is formed of a material which softens at a temperature no greater than 170° C.

* * * * *